United States Patent [19]

Thor

[11] Patent Number: 4,926,349
[45] Date of Patent: May 15, 1990

[54] METHOD FOR DISPLAY PANEL PROCESSING

[75] Inventor: Leif R. Thor, Lidingö, Sweden

[73] Assignee: International Business Machines Corporation, Armonk, N.Y.

[21] Appl. No.: 44,692

[22] Filed: May 1, 1987

[30] Foreign Application Priority Data

Aug. 15, 1986 [SE] Sweden ................................ 8603442

[51] Int. Cl.$^5$ ......................... G06F 15/20; H04N 7/14
[52] U.S. Cl. .................................. 364/523; 340/723; 358/93; 364/521
[58] Field of Search ............... 364/512, 518, 521, 522, 364/523; 340/709, 711, 723; 358/93

[56] References Cited

U.S. PATENT DOCUMENTS

| | | | |
|---|---|---|---|
| 4,275,449 | 6/1981 | Aish | 364/512 |
| 4,539,585 | 9/1985 | Spackova et al. | 358/93 |
| 4,549,275 | 10/1985 | Sukonick | 364/521 |
| 4,551,810 | 11/1985 | Levine | 364/512 X |
| 4,656,602 | 4/1987 | Berkland et al. | 340/709 X |
| 4,688,181 | 8/1987 | Cottrell et al. | 364/518 X |
| 4,731,743 | 3/1988 | Blancato | 364/521 |
| 4,764,867 | 8/1988 | Hess | 364/521 X |
| 4,794,386 | 12/1988 | Bedrij et al. | 364/518 X |

OTHER PUBLICATIONS

*Operations Planning and Control, General Information Manual,* IBM Publication No. GH19-6120-2 (May 1981).

*VSE/VSAM, General Information,* IBM Publication No. GC24-5143-(Feb. 1982).

M. E. Maurer, *IBM Systems Journal,* vol. 22, pp. 246-261 (1983).

*Interactive System Productivity Facility, Version 2 General Information* IBM Publication No. GC34-2181-0 (Oct. 1984).

J. A. Lucas *Designing Applications For the Professional 300 Series* (Digital Equipment Corp., 1984), pp. 10-13, 27-48.

*Primary Examiner*—Gary V. Harkcom
*Assistant Examiner*—H. R. Herndon
*Attorney, Agent, or Firm*—J. David Ellett, Jr.

[57] ABSTRACT

In an interactive terminal-host data processing system display panel processing is performed in a sequence of steps. A horst data base stores a display panel library and data. The terminal displays a list of panel layouts for panels stored in the library. One layout is selected from the llist and displayed on the selected panel layout. The selected panel layout is modified at the terminal when the panel is displayed. The modified panel layout is stored in the panel library. The stored panels, including the modified panel, are utilized in the interactive data communication between the terminal and the host data base.

13 Claims, 10 Drawing Sheets

```
------- COMMUNICATING WITH WORK STATIONS -------                RTOPP
Option ===>

Select one of the following:

1 READY LIST     - Communicate status of operations.
2 WAITING LIST   - List submitted jobs with waiting status.
3 JOB SETUP      - Select job for preparation.
4 WORK STATIONS  - Display work station status.
9 DEFINE RL      - Define alternative ready list layouts.
```

FIG. 5

```
LN  --+----1----+----2----+----3----+----4----+----5----+----6----+----7----+----8
 1  -------------------- SPECIFYING READY LIST CRITERIA -----------------------
 2  Command ==>                                                          RSRLP
 3
 4  Enter/change data below and press ENTER to create a ready list.
 5
 6  WORK STATION NAME    ==> SETP     (Blank presents a list.)
 7  READY LIST TYPE      ==> MANUAL   A predefined ready list type
 8
 9  Selection criteria:
10  APPLICATION ID       ==> A*
11  JOB NAME             ==>
12  LOWEST PRIORITY      ==>          Lowest priority to be selected.
13  OPERATION STATUS     ==> AR*      List selected status. (S,A,R,I,*)
14
15  Ending date, time:                Limit list to operations with any of the
16  DATE                 ==>          following values before given date, time:
17  TIME                 ==>          Latest start, Input arrival, Planned start.
18
19
20
21
22
23
24
LN  --+----1----+----2----+----3----+----4----+----5----+----6----+----7----+----8
```

FIG. 6

```
------- READY LIST -----------------------------  ROW 1 OF 2
Command ===>                                    Scroll ===> HALF
                                                              RSRLM
Enter any of the following row commands:
S - Set next logical status, S-x - Set specific status( x ),
R - Reset status, O - Operator Instructions, I - Information of application WORK STATION       ===> CPU1         Change to switch work station
READY LIST TYPE    ===> CPU          Change to switch ready list type Cmd Jobname   S X Application   Adiadate adiatime Num Operation Text
'''  AI3052JA     AI3052        85/09/19 14.00    10  UPDATE
'''  JABA6        AI3062        85/09/20 02.00     5  JABA
************************************ BOTTOM OF DATA ************************************
```

FIG. 7

```
------- SELECTING A READY LIST LAYOUT -------   ROW 1 OF 9
Command ===>                                 Scroll ===> HALF Enter the CREATE command above to create a new layout or        RLCLL
enter any of the row commands below:
S - select a layout, C - create a copy of a layout Row Id       Description                          Owner      Last update
cmd Header
    PREP         Ready list for JCL preparation    LEIFTOR    85/10/16  10.20
                 Jobname Operation Text     Last Date Lst.T Application
    MANUAL       Normal manual layout              LEIFTOR    85/11/07  13.30
                 S Wsn. Num Operation Text  Application    LO Lst.T
    PRINTER      Layout for print operations       LEIFTOR    85/10/16  11.32
                 S Wsn. Num Jobname Operation Text    Class Durh Durm Form nr.
    JOBNAMES     Mvs jobs on a CPU work station    LEIFTOR    85/11/19  13.25
                 Jobname   S X Wsn. Num Operation Text  Class AS AStime Prty Durh Durm
    WAITLIST     Waiting submitted MVS jobs        LEIFTOR    85/10/17  14.14
                 Jobname A.A date AAtime Wsn. Num Operation Text  Class Prty Durh Durm
    JOBS         MVS jobs in current plan          LEIFTOR    85/10/17  14.20
                 Jobname Class S X Wsn. Num Operation Text   Application  Prty
    CPU          Normal CPU workstation            LEIFTOR    85/10/21  10.29
                 Jobname  S X Application   Adiadate adiatime Num Operation Text
    JOBLIST      MVS jobs in current plan          LEIFTOR    85/11/19  08.48
```

FIG. 8

```
------- READY LIST LAYOUTS -------------- ROW 1 OF 9
Command ===>                                Scroll ===> HALF Enter the CREATE command above to create a new layout or         RRLLL
enter any of the row commands below:
B - Browse, C - Copy, D - Delete, or M - Modify Row Layout                                                  Last update
cmd id       Description                         Owner      date     time
    PREP     Ready list for JCL preparation      LEIFTOR    85/10/16 10.20
    MANUAL   Normal manual layout                LEIFTOR    85/11/07 13.30
    PRINTER  Layout for print operations         LEIFTOR    85/10/16 11.32
    JOBNAMES Mvs jobs on a CPU work station      LEIFTOR    85/11/19 13.25
    WAITLIST Waiting submitted MVS jobs          LEIFTOR    85/10/17 14.14
    JOBS     MVS jobs in current plan            LEIFTOR    85/10/17 14.20
    CPU      Normal CPU workstation              LEIFTOR    85/10/21 10.29
    JOBLIST  MVS jobs in current plan            LEIFTOR    85/11/19 08.48
    CPU2     Normal CPU workstation              LEIFTOR    85/11/19 13.12
    ************* BOTTOM OF DATA ***************************
```

FIG. 9

```
------- CREATING A READY LIST LAYOUT -------- ROW 1 OF 54
Command ===>                                  Scroll ===> HALF Enter/Change data below:                               RLLCL LAYOUT ID        ===> CPU       Identity of this layout
DESCRIPTION      ===> Normal CPU workstation Current layout below:
      Jobname  S X Application    Adiadate adiatime Num Operation Text Enter S in the S column to select a field to be displayed.
Order selected fields by numbering them 01-99 in the S column.
Enter Y in the H column to highlight a field in the ready list.

S   H  Column title          Lgth Description of column content
1   Y  JOBNAME                 01
2      STATUS                  01
3      EXTSTAT                 01
4      ADID                    01
5      ADIADATE                01
6      ADIATIME                01
7   Y  NUMBER                  01
8      TEXT                    01
```

FIG. 10

```
------- MODIFYING A READY LIST LAYOUT ----------- ROW 1 OF 54
Command ===>                                      Scroll ===> HALF Enter/Change data below:

Layout id        : CPU                                         RLLML
DESCRIPTION      ===> Normal CPU workstation Current layout below:
      Jobname  S  X Application    Adiadate adiatime Num Operation Text Enter S in the S column to select a field to be displayed.
Order selected fields by numbering them 01-99 in the S column.
Enter Y in the H column to highlight a field in the ready list.

S   H Column title         Lgth Description of column contents
1   Y JOBNAME                01
2     STATUS                 01
3     EXTSTAT                01
4     ADID                   01
5     ADIADATE               01
6     ADIATIME               01
7   Y NUMBER                 01
8     TEXT                   01
```

4,926,349

METHOD FOR DISPLAY PANEL PROCESSING

TECHNICAL FIELD

The present invention relates to a method for display panel processing and more particularly to panel processing in an interactive terminal-host data processing system.

BACKGROUND OF THE INVENTION

A number of display processor systems are known in the art as set forth below.

An interactive terminal-host data processing system is described in a paper by M. Maurer entitled "Full screen testing of interactive applications", IBM Systems Journal, Vol. 22, No. 3, 1983, PP246–261.

An interactive data processing system is also described in the IBM Manual "Interactive System Productivity Facility", Publication No. GC34-2181-0, Oct. 1984.

The interactive system productivity facility/program development facility (ISPF/PDF) described in the cited two publications provides dialog management services in host computer environments to users of display terminals. Dialog management services may be used by an application developer to produce interactive applications in the form of menu-driven dialogs and dialog functions to make the application easy to use by a non-experienced user.

ISPF/PDF is a dialog application that provides application development services to both experienced and non-experienced professional people. It is used to create and maintain both source programs and text data. ISPF/PDF provides interfaces to many system facilities via easy to use menus, relieving the users of the need to know the specific command syntax of the interactive system they are using.

The ISPF/PDF facility provides an interface between a user terminal and a host data base including a display panel library and a data table library. The ISPF/PDF facility makes the panel and data libraries transparent to the end-user at the terminal. Some of the panels in the panel library, selection panels, are available for the terminal operator as selection menus, whereas other panels are functioning as data entry panels, for data access between the terminal and the data tables in the data base.

Whereas ISPF/PDF facility extensively improves the interactive data flow between the operator at the terminal and his data base in the host system, there is still a need for improvements providing a still better service for the terminal operator. Some times, for instance; the operator has to handle a large amount of display panel lay-outs which frequently must be changed and such a housekeeping work might be for certain applications cumbersome and time-consuming.

DISCLOSURE OF THE INVENTION

An interactive terminal-host data processing system is disclosed in which display panel processing is performed in a number of steps. A host data base stores a display panel library and data. The terminal displays a list of panel layouts for panels stored in the library. One layout is selected from the list and the selected panel layout is displayed. The selected panel layout is modified at the terminal when the panel is displayed. The modified panel layout is stored in the panel library. The stored panels, including the modified panel, are utilized in the interactive data communication between the terminal and the host data base.

BEST MODE OF CARRYING OUT THE INVENTION

Figure 1:
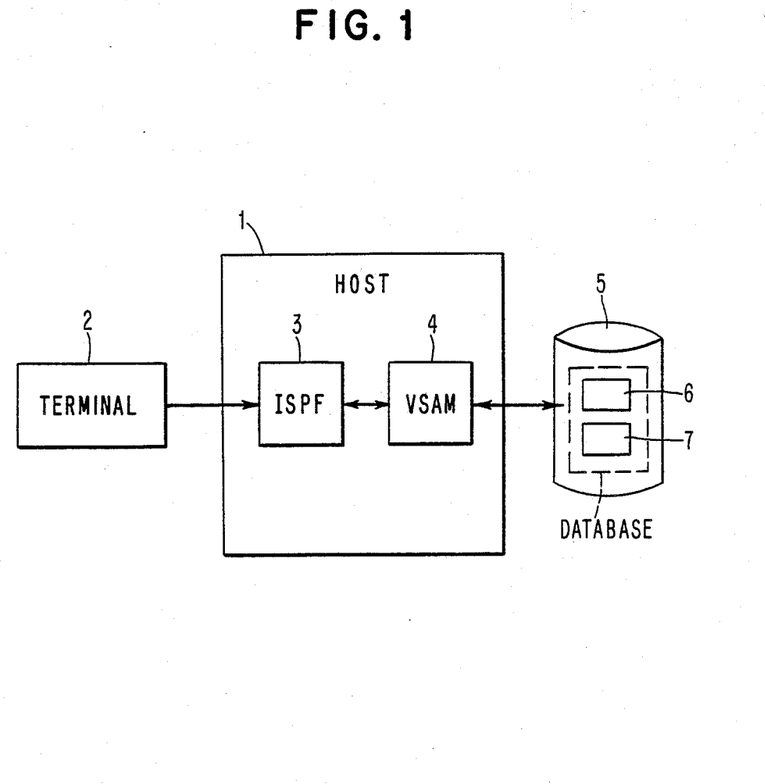
FIG. 1 discloses a block diagram of a terminal host interactive system to be used according to the present invention.

FIG. 1 discloses an interactive terminal-computer system including a host computer 1, an operator terminal 2 and a peripheral storage unit 5 such as a direct access disk storage. The storage 5 comprises a data base 8 including a panel library 6 and a table library 7. The panel library 6 comprises a plurality of display panels to be selectively accessed by the operator at terminal 2 and displayed at the terminal display unit. Some of the panels in the panel library 6 are selection panels to be used when accessed as menus for further selection of store information. Other panels are data entry panels to be used by the terminal operator for table access and for updating data in the tables of the table library 7.

The dialog between the terminal 2 and the host 1 for information access to the data base 8 is managed by the interactive system productivity facility (ISPF)/3 in the host. This ISPF/3 operates as a dialog manager freeing the terminal operator from a complex and detailed program handling operation. The data access between the host 1 and the disk storage 5 is controlled by a well-known VSE-Virtual Storage Access Method block 4 as described in the IBM Publication VSE-Virtual Storage Access Method General Information, GC24-5143.

According to the present invention the terminal-host dialog will not only enable panel access and update operations at the terminal 2 but will also enable favorable able methods for dynamically creating, selecting and modifying panels in the panel library 6.

The present invention will now be described more in detail as an implementation in an Operations Planning and Control system, more particularly described in the IBM Publication Operations Planning and Control, GH 19-6120-2. However, it should be understood that such an implementation is only taken as an example. The invention is useful in many other interactive terminal-host applications.

Operations Planning and Control (OPC) is a system designed to enable planning and monitoring of the operations in a Data Processing (DP) operations department from the receipt of input data to the delivery of final results and reports to the user.

The basis of the OPC system is data sets which define the installation and the work processed. In these data sets, it is defined when the installation is operational, how much capacity is available for each type of work activity, how often applications run, and what resources each application requires. Once these data sets have been built up, they provide valuable documentation about the entire operation. They also provide the basis for the OPC plans by showing when and how work is to be processed by the DP operations department.

OPC is an on-line monitoring system designed to be used by the operators as they are performing their jobs. As work flows through their work stations, they report to OPC on the status of each individual application. OPC in return informs them about work being processed at other work stations so they may prepare in advance. When jobs arrive, OPC suggests the order in which work should be processed, and shows information such as deadlines, how long jobs will take to be processed, and what processing is required.

OPC facilitates job control (JCL) preparation by providing a menu-driven dialog, by which job setup clerks can prepare JCL in advance via a display terminal. They can also modify a JCL already prepared.

OPC automates complex and/or repetitive operator tasks, by automatically controlling when a job is ready to be executed, dependent on time-of-day or dependent on other preparations or jobs having to be completed. When a job is ready to run, OPC will automatically pick out the correct version of the JCL, submit the job (if not done beforehand), and release it.

OPC is not just a monitoring system. It is also a resource planning system, because OPC produces planning information well in advance of when applications are due to be processed. Prior to starting up the day's operations, OPC planning functions analyze the whole network of interdependent operations for that session. It breaks processing down into fine detail, examining each operation of an application at each individual work station. It organizes the workflow to minimize missed deadlines, and gives the fastest throughput to the highest priority jobs.

Some days or weeks before a session, Operations Management can review these plans and prepare the operations organization. One can identify peak and slack periods and determine what capacity is needed. By simulating what is likely to happen using different configurations with different workflows, the open hours and manpower requirements at work stations can be predetermined to provide an acceptable service level to application owners and an acceptable work load for the personnel.

OPC constructs long-term and daily plans based on user-supplied descriptions of the DP operations department and its work: these plans help DP operations do its job effectively.

DP operations is usually organized into small groups which specialize in some particular step in the production process. These groups are called "work stations" by OPC.

There are three different types of work stations:

Computer work stations. A computer work station contains one processor, or a group of processors serving a single job queue.

Print work stations.

General work stations. General work stations describe all work stations except computer work stations and print work stations.

When describing work stations to OPC, it should be done in terms of one of these three types. The description should also specify the hours when a work station is open, the resources available at the work station, and certain other characteristics.

Figure 2:
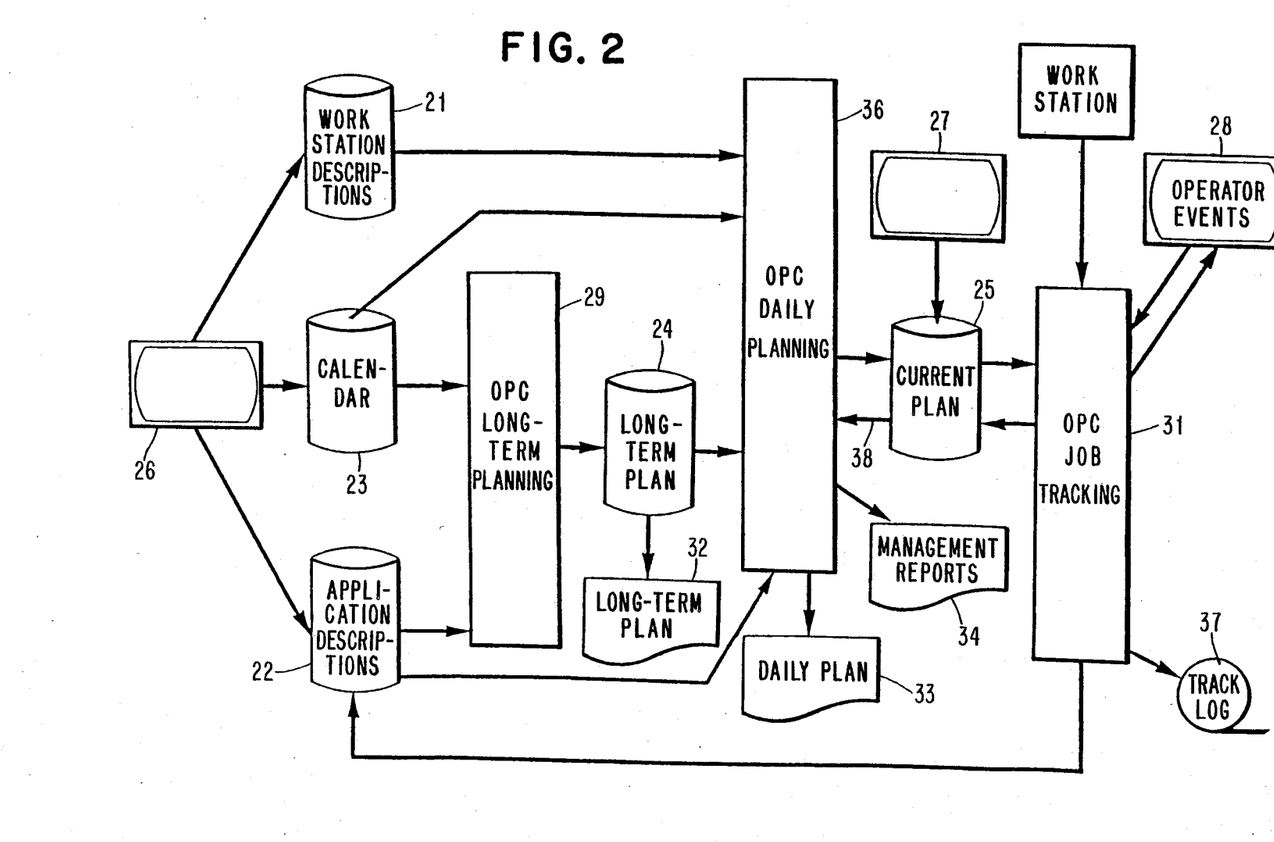
FIG. 2 discloses a block diagram of an operation planning and control (OPC) system including the present invention.

The overall OPC functions will now be described with reference to FIG. 2.

The work to be performed in the DP installation must be described and stored in OPC application description data sets 22. Similarly the work station descriptions are stored in data sets 21. A calendar, specifying working days and holidays etc. is stored in a calendar storage 23. All these basic information can be updated and controlled by an operator at a terminal 26.

The calendar information and application description information can be combined in OPC long-term planning block 29 and stored in long-term planning storage 24. This long-term planning storage 24 can produce long-term planning records 32.

The work station information, the calendar information and long-term planning information can be combined in an OPC daily planning function 36 to be stored in a current plan storage 25. The OPC daily planning information 36 can produce a daily plan 33 and a management report 34. The current plan 25 can be updated and controlled by an operator at a terminal 27. The updated current plan can also be used to update the OPC daily planning function 36, as indicated by the arrow 38.

An OPC job tracking function 31 is tracking work station events 35 and is interactively controlled by an operator event terminal 28. The OPC job tracking function 31 produces a tracklog 37. The job tracking function 31 is also fed back to the application description storage 22 as indicated by the arrow 39.

The work station communication dialog panel flow will now be described with reference to FIG. 3.

The purpose of the work station communication is to communicate statuses of events between OPC and the work station operator. As part of this process some special functions are also presented to the work station operator. These are:

list of jobs that have been submitted but are not yet ready to be run, so called waiting list.

list of jobs defined to current plan for preparation.

list of work stations for status information.

a function to redefine ready list layouts.

The main function of the work station communication is however the handling of ready lists. In this function a list of operations that are ready to be reported on is presented to the operator. The operator then reports the status changes he is doing to the operations. Each time the list is displayed it is updated so that it always shows the current status.

Before the list is displayed the operator may limit the contents of the list by specifying selection criteria. The layout and sort order of the list can also be dynamically changed all the time. Besides reporting status changes the operator can get full information of any operation in the list, also looking at operator instructions if any exist. If the work station is defined as a job setup work station, selecting an operation to be started gives access to the editor for editing the JCL for the selected job. At completion of the editing the operation will automatically be set to completed.

The communication dialog is started by the operator at the terminal 2 in FIG. 1 accessing a main menu panel. More specifically such main menu might be the OPC main menu accessed by the operator at the terminal 28 according to FIG. 2. From this main menu, not shown, the operator might select a work station communication RTOPP panel 40 in FIG. 3. This RTOPP panel is shown in more detail in FIG. 4.

Figure 4:
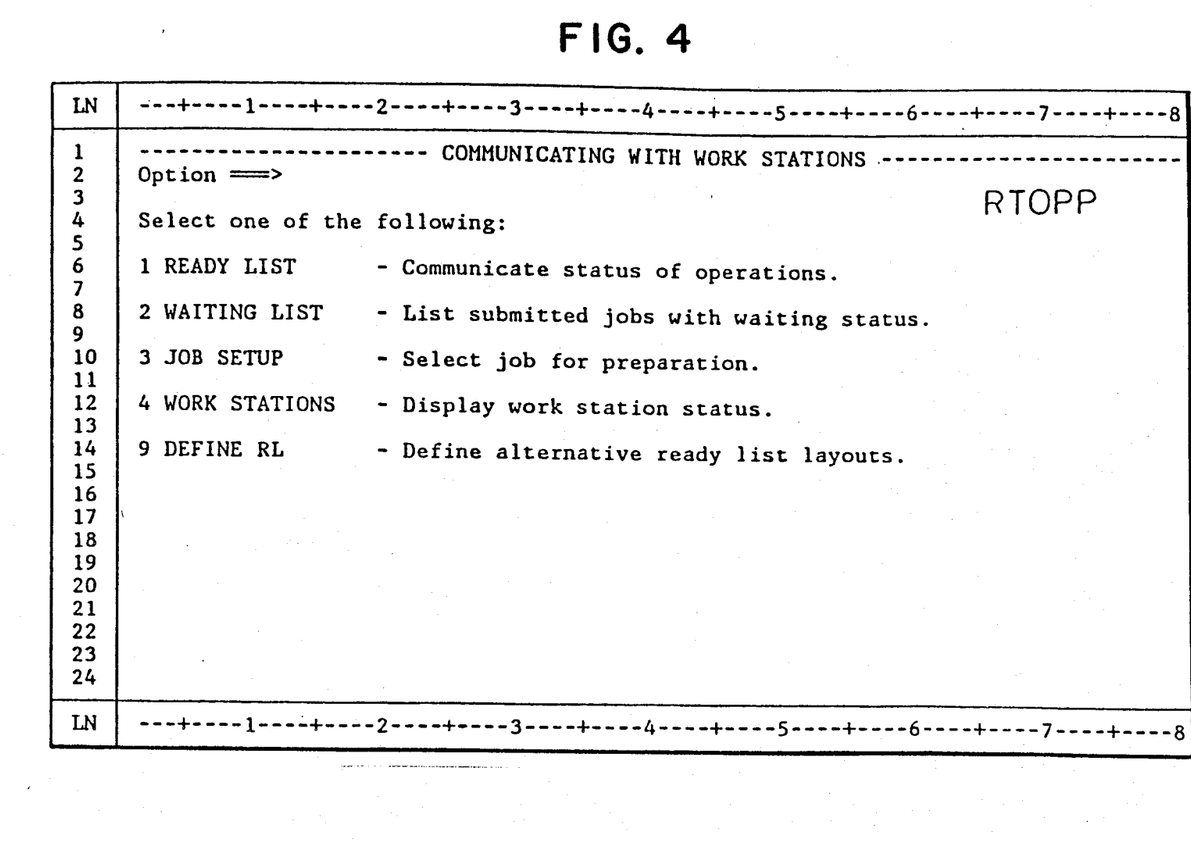
FIGS. 4–10 discloses display panels according to the present invention.

The function of RTOPP is to let the user browse and report status of operations in the current plan and prepare JCL for jobs in the plan. The operator may select one of the operations by inserting 1-9 into the option line.

The operations selected are as follows:

1. SELECT READY LIST—Displays a panel where the user specifies select criteria for the ready list, and then displays the list. In the list the user can report status of operations, browse operation information or operator instructions.

2. SELECT WAITING LIST—Displays a panel where the user specifies select criteria for the waiting list, and then displays the list. In the list the user can browse operation information or operator instructions.

3. SELECT JOB FOR SETUP—Displays a panel where the user specifies select criteria for the jobs to be prepared and then displays the list. In the list the user can edit JCL for a job, browse operation information or operator instructions.

4. DISPLAY WS STATUS—Displays a list with all work stations in current plan.

Please note that operations 5-8 are not utilized, and accordingly are omitted.

9. DEFINE RL LAYOUT—Gives the user an opportunity to define or redefine the layout of ready lists. The user may override the installation defined layouts or add, change and delete his own layouts. The user defined layouts are kept for this user.

Figure 3:
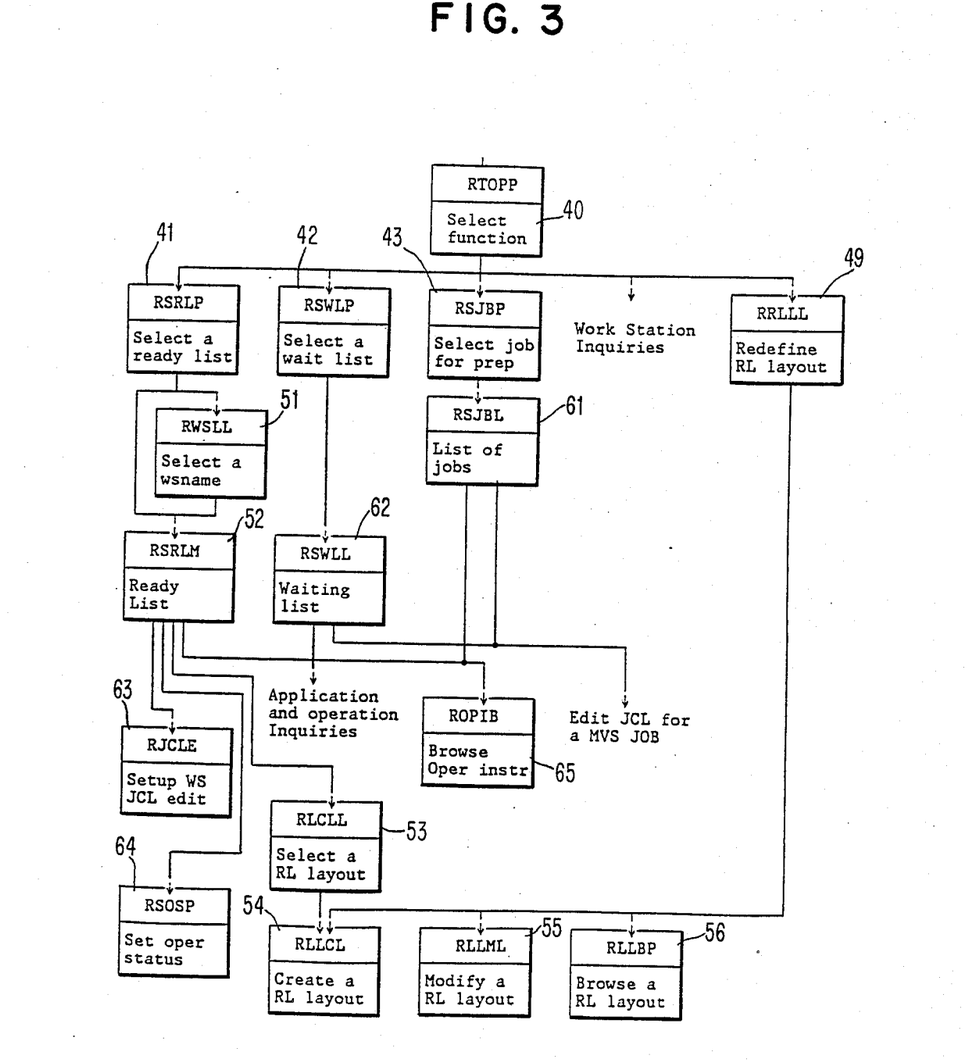
FIG. 3 discloses a work station communication dialog panel flow according to the present invention.

In case the operator selects the number 2, waiting list, he will get the panel 42 RSVLP according to FIG. 3. If he selects the number 3, job setup, he will get the RSJBP panel 43 according to FIG. 3.

Figure 5:
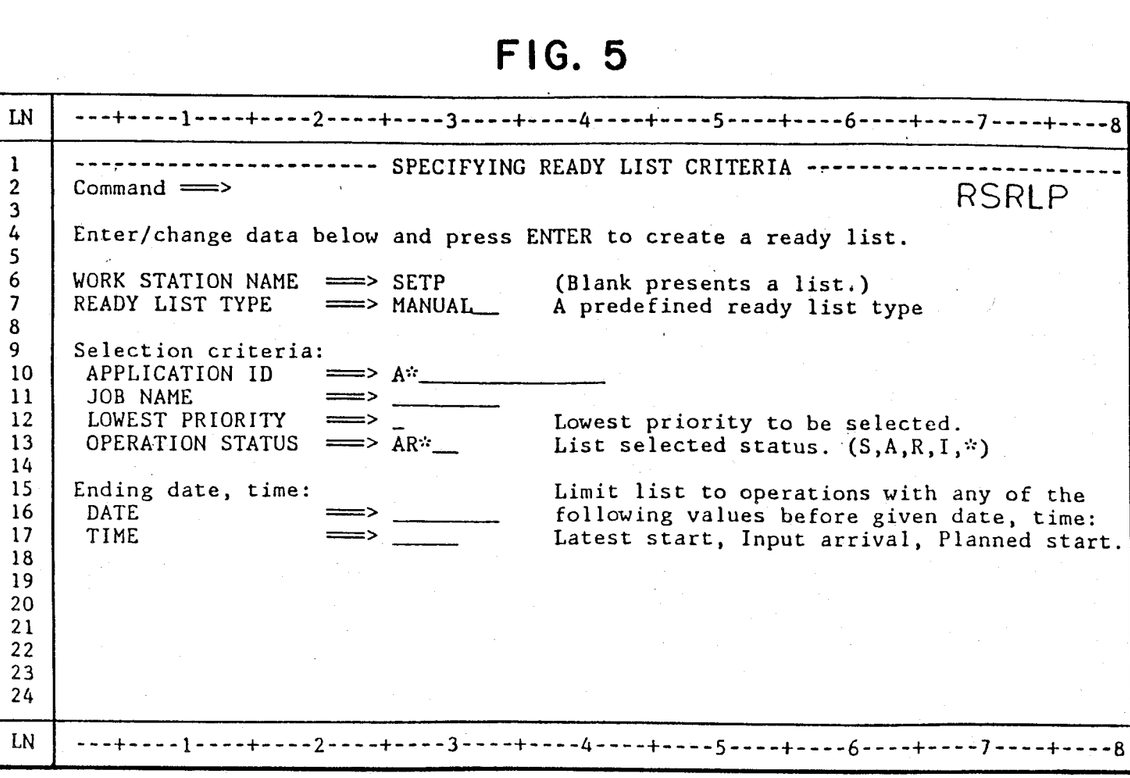

In case the operator selects number 1, ready list, he will get the panel RSRLP 41 in FIG. 3. RSRLP, specify ready list panel is shown in more detail in FIG. 5. The function of the panel is as follows:

The user can specify work station and ready list layout for the ready list to be displayed. The user may also limit the contents of the ready list by entering values for the optional selection criteria. If any selection criteria is entered only the operations that match that criteria will be part of the ready list. If work station name is not given the user will be presented a list of the work stations in the current plan. The user then selects the wanted work station from that list. If the given ready list layout does not exist or if a ready list layout is not given a list of existing layouts will be presented to the user. The user may then select a layout from the list or choose to create a new layout which will then be used. ENTER executes the selected option or issues an error message and END, CANCEL returns to previous panel, while RETURN returns to previous main menu (OPC main menu).

| Field | Reply - Action |
|---|---|
| WORK STATION NAME | Name of the work station to be used. If the name is blank or invalid a list of existing work stations will be presented an the operator can choose one from the list. The field is initialized with the work station name last used by the user. |
| READY LIST TYPE | Name of the ready list layout to be used. If the name is blank or invalid a list of existing layouts will be presented and the operator can choose one from the list. The field is initialized with the layout name last used by the user. |
| APPLICATION ID | A generic name that limits the contents of the list to operations that have an application id that matches the given one. The field is initialized with the value last used by the user. |
| JOB NAME | A generic name that limits the contents of the list to operations that have a job name that matches the given one. The field is initialized with the value last used by the user. |
| LOWEST PRIORITY | A value 1 to 9 representing the lowest priority an operation can have in order to be selected. The field is initialized with the value last used by the user. |
| OPERATION STATUS | A combination of the statuses:<br>. A - arrival<br>. B - ready<br>. S - started<br>. I - interrupted<br>. * - waiting for a special resource<br>the status codes can be given in any order. Use of the field limits the contents of the list to operations that have any of the listed statuses. The field is initialized with the value last used by the user. |
| DATE | A date in user date format that limits the contents of the list to operations that have any of the following dates lower than the given one:<br>. Operation Input Arrival<br>. Planned Start<br>. Latest Start<br>The field is initialized with the value last used by the user. |
| TIME | A time in user time format that limits the contents of the list to operations that have any of the following times lower than the given one:<br>. Operation Input Arrival<br>. Planned Start<br>. Latest start<br>The field is initialized with the value last used by the user. |

In case the work station name in the panel RSRLP in FIG. 5 is blank, a panel RVSLL 51 in FIG. 3 will be selected. This panel will present a list of work stations in the current plan and from this list a specific work station can be selected.

Figure 6:
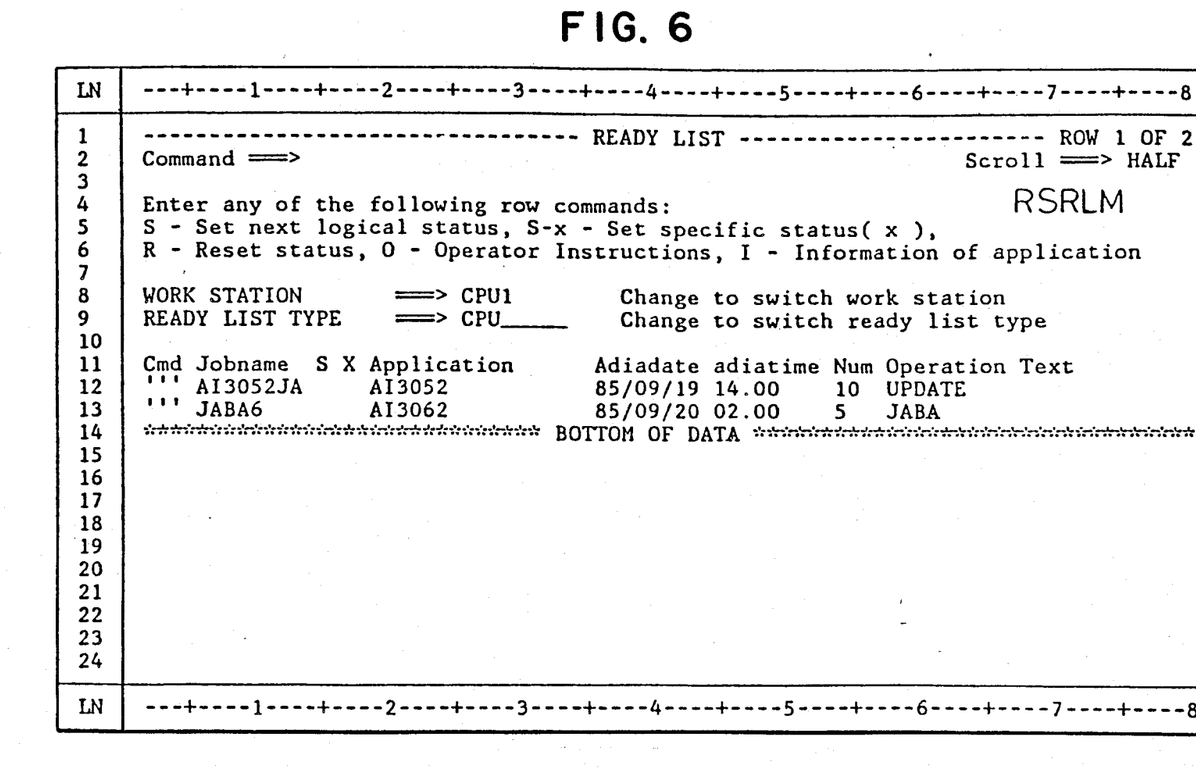

According to this selection made in the panels 41 and 51 in FIG. 3 or only in the panel 41 a ready list panel RSRLM 52 will be accessed. RSRLM 52 is shown in more detail in FIG. 6. The function of the ready list panel is as follows:

Displays a list of operations that are ready on the work station. "Ready" means that the status of the operation can be changed, i.e. that it does not depend on any other operations or has not yet completed or ended in error. The user can change status of an operation in the list by reporting the status back to OPC. The list is sorted in user defined order, and every time an operation has been selected or just ENTER key has been pressed the list will be refreshed and resorted before being redisplayed. The layouts of the list are defined by the installation and/or user defined ready list layout. Work station and ready list layout can be dynamically changed directly in the ready list. The sort order can also be dynamically redefined any time. The list can be scrolled via a scroll command.

| Field | Reply | Action |
|---|---|---|
| Command | Enter | The ready list will be refreshed. |
| | END | Normal return to ready list selection. |
| | RETURN | Normal return to OPC main menu. |
| | CANCEL | Return to ready list selection, without execution of pending row commands. |
| | ISPF | Normal ISPF commands. |
| Scroll | ISPF | Normal ISPF scrolling values |
| WORK STATION | | Change value if the ready list is to be displayed for a new work station. If the field is blank a list of existing workstations is displayed. |
| READY LIST TYPE | | Change value if another list layout is to be used. If the field is blank or a nonexistent layout is given a list of existing layouts is displayed. |
| Row cmd | | Row command in list, following commands are valid. |
| | S | Set next logical operation status. |
| | S-x | Set specific status; Where x can be any of: S Set operation status to started I Set operation status to interrupted R Set operation status to ready C Set operation status to completed E Set operation status to ended in error |
| | R | Reset operation status to previous state |
| | O | Display operator instruction for operation |
| | I | Inquire information of application |
| Other column headers | | Defined in the ready list layout. |

Figure 7:
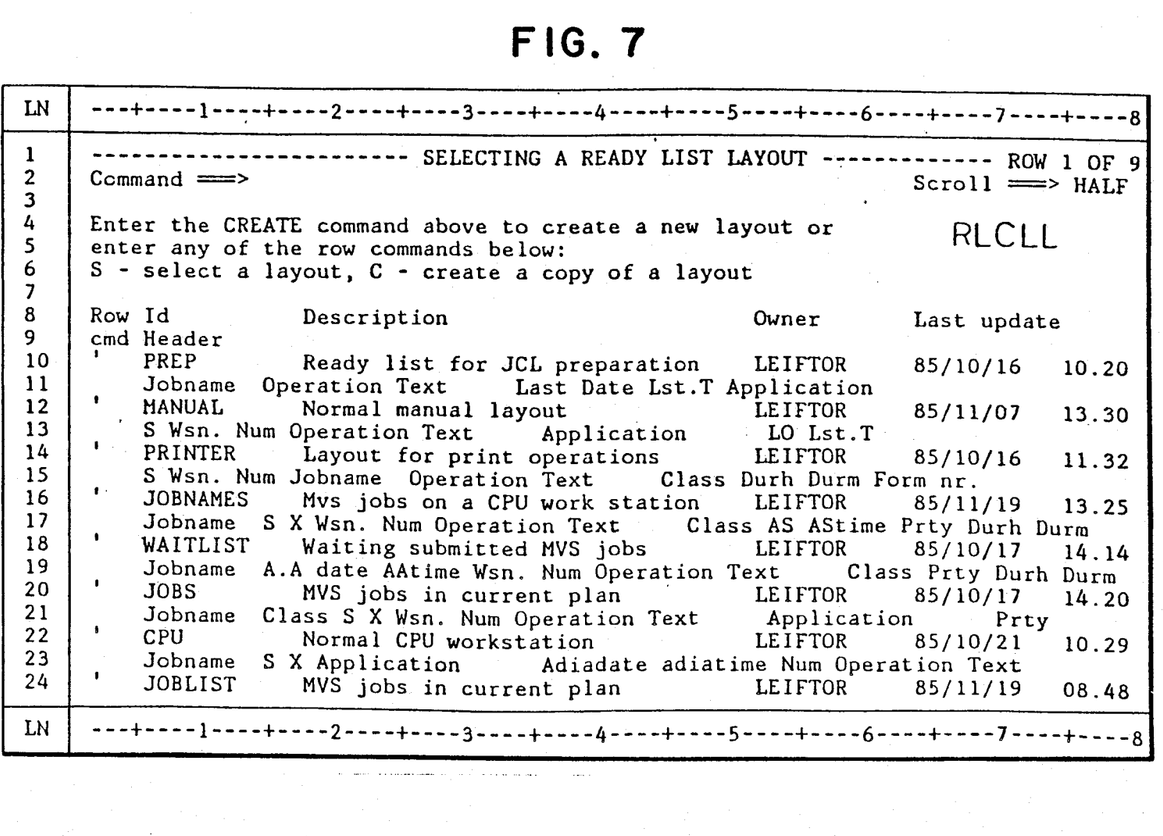

As mentioned above, a list of existing layouts will be displayed when the line "ready list type" in FIG. 6 is left blank. The panel RLCLL 53 in FIG. 3 presents such a list of ready list layouts. FIG. 7 discloses a detailed picture of the panel RLCLL/list of ready list layouts. The function of this panel is as follows:

Displays a list of the existing ready list layouts for the user to select one from. The user can select a layout or create a new list layout. The list can be scrolled via the scroll command.

| Terminates with END, RETURN or CANCEL | |
|---|---|
| Field | Reply - Action |
| Command | XTBLX Normal commands handled by OPC. where END/RETURN accepts changes and CANCEL rejects them. ISPF Normal ISPF commands. Create Creates a new layout from scratch. |
| Scroll | ISPF Normal ISPF scrolling values. |
| Row cmd | Row command in list, following commands are valid. S Selects a layout to be used in ready list. C Copies the selected layout to a |

| Terminates with END, RETURN or CANCEL | |
|---|---|
| Field | Reply - Action |
| | new. The new layout will be used in ready list. |
| Layout header | Name of the ready list layout. This is the name that is referred to in the display and selection of ready lists. |
| Description | A verbal description of the ready list type. |
| Owner | TSO is of the owner of the layout. The owner can either be the id of the installation defined layouts, or the id of the current user. |

Figure 8:
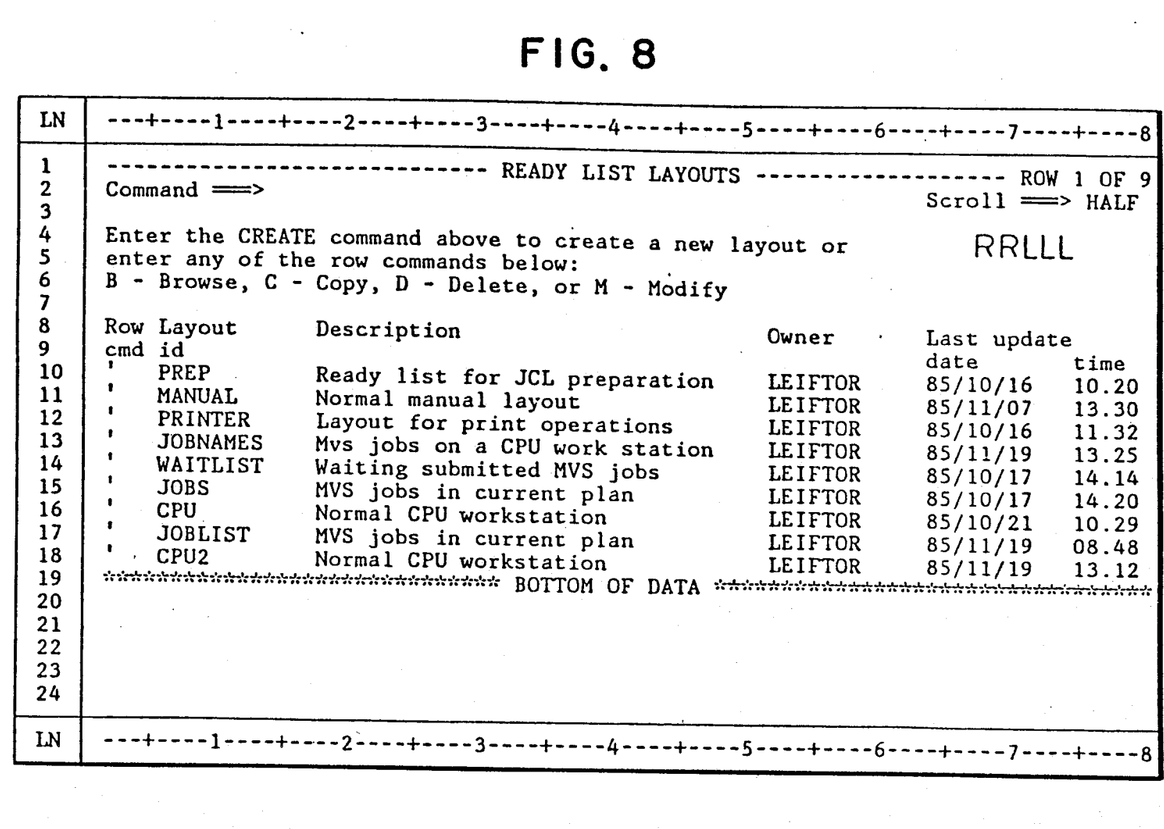

In case option No. 9, define alternative ready list layouts, in RTOPP Panel 40 is selected, a panel RRLLL 49, a list of ready list layouts, will be displayed as shown in FIG. 8. The function of the RRLLL panel is as follows:

Displays a list of the existing ready list layouts for the user to handle. The user can select to display, delete, change, copy or create a list layout. The layouts displayed are both the user's own definitions and the installation provided layouts, unless they are overridden by a user definition. The list can be scrolled via the scroll command.

| Terminates with END, RETURN or CANCEL | |
|---|---|
| Field | Reply - Action |
| Command | XTBLX Normal commands handled by OPC. where END/RETURN accepts changes and CANCEL rejects them. ISPF Normal ISPF commands. CREATE Creates a new layout from scratch. |
| Scroll | ISPF Normal ISPF scrolling values. |
| Row cmd | Row command in list, the following commands are valid: B Browses an existing ready list layout. C Copies the selected layout to a new. M Modifies an existing layout. D Deletes an existing user definition of a layout. All modified and created layouts are kept as user definitions of the layouts and override the installation definitions if necessary. |
| Layout id | Name of the ready list layout. This is the name that is referred to in the display and selection of ready lists. |
| Description | A verbal description of the ready list type. |
| Owner | TSO id of the owner of the layout. The owner can either be the id of the installation defined layouts, or the id of the current user. |
| Last update | Date and time in user format when the layout has last been modified. The last modifier is always the owner. |

According to FIGS. 7 and 8 a new list layout can be created from scratch by entering the command CREATE into the panel RLCLL 53 and panel RRLLL 49 respectively. This can also be seen from FIG. 3 where a panel RLLCL 54 for creating a new layout is invoked either from the panel 53 or the panel 49.

Figure 9:
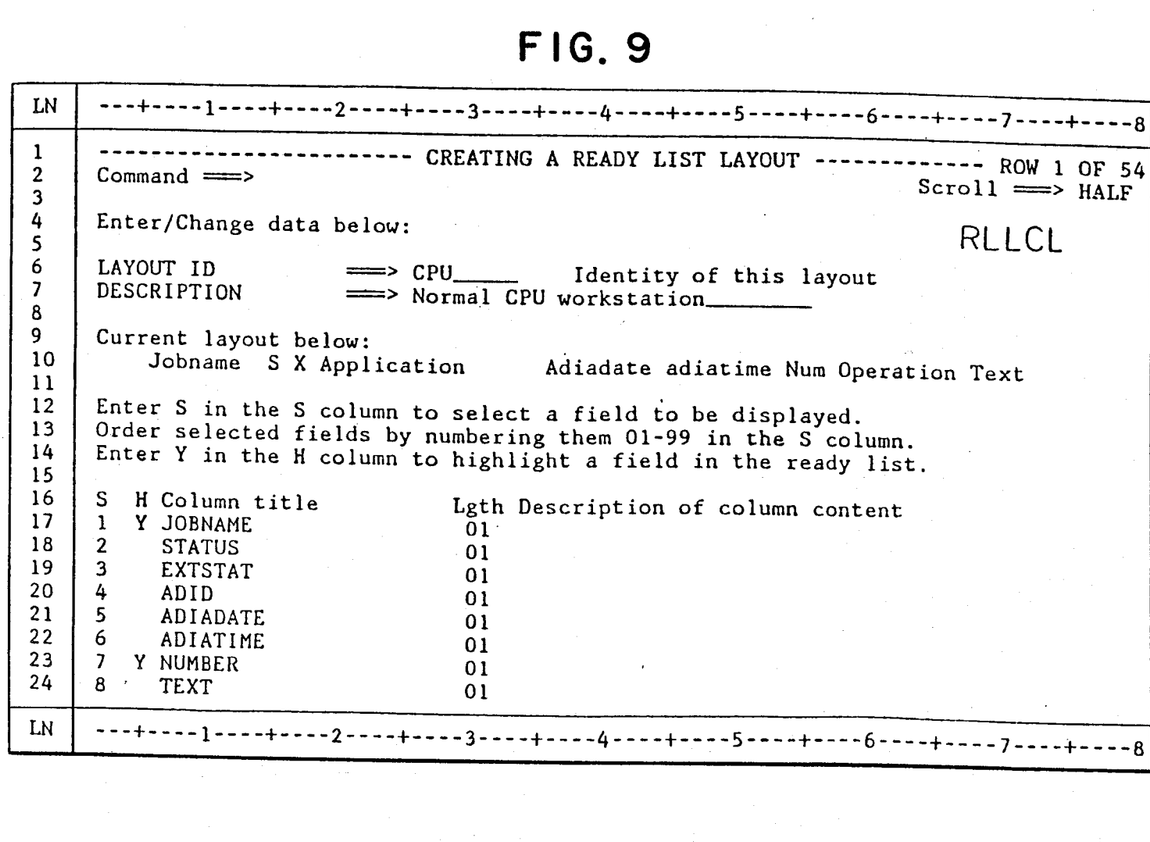

The panel 54 for creating a ready list layout is disclosed in more detail in FIG. 9 and the function of this panel is as follows:

Lets the user create a new ready list layout. The user can give a name and descriptive text for the layout and creates the layout by selecting the fields to be displayed from a list of the fields that exists for the ready list. The user can define which order the fields are to be displayed and if a field is to be highlighted or not. If the number of selected fields exceeds the available size on the screen only the fields that can be displayed fully will be displayed in the layout. The current layout header will be displayed on the screen every time the user presses ENTER. The list of fields can be scrolled via the Scroll command.

Terminates with END, RETURN or CANCEL

| Field | Reply - Action |
|---|---|
| Command | XTBLX Normal commands handled by OPC. |
| | CANCEL rejects creation of the layout. |
| | ISPF Normal ISPF commands. |
| Scroll | ISPF Normal ISPF scrolling values. |
| READY LIST TYPE | The name of the new layout, must be given and may not be an existing one. |
| LAYOUT DESCRIPTION | An optional descriptive text for the layout. |
| Layout Header | The current header as it is composed of the currently selected fields. Not modifiable. |
| S | Selects a field to be displayed. blank Removes a field from the layout. S Selects a field to be a part of the layout. The field will be placed at the end of the selected fields. 1-99 Selects and orders a field in the layout. The fields are ordered in the layout according to the given number. If several fields have been assigned the same ordering number their order is unpredictable. |
| H | Specifies if a field is to be highlighted. A selected field will be displayed as a normal status field. Y The field will be displayed as an emphasized status field. |
| Column title | The title of the field as it will appear in the header. |
| Length | The length of the field. The space reserved for the field in the layout is the maximum of this value and the length of the title. |
| Description | A descriptive text of the field. |

Figure 10:
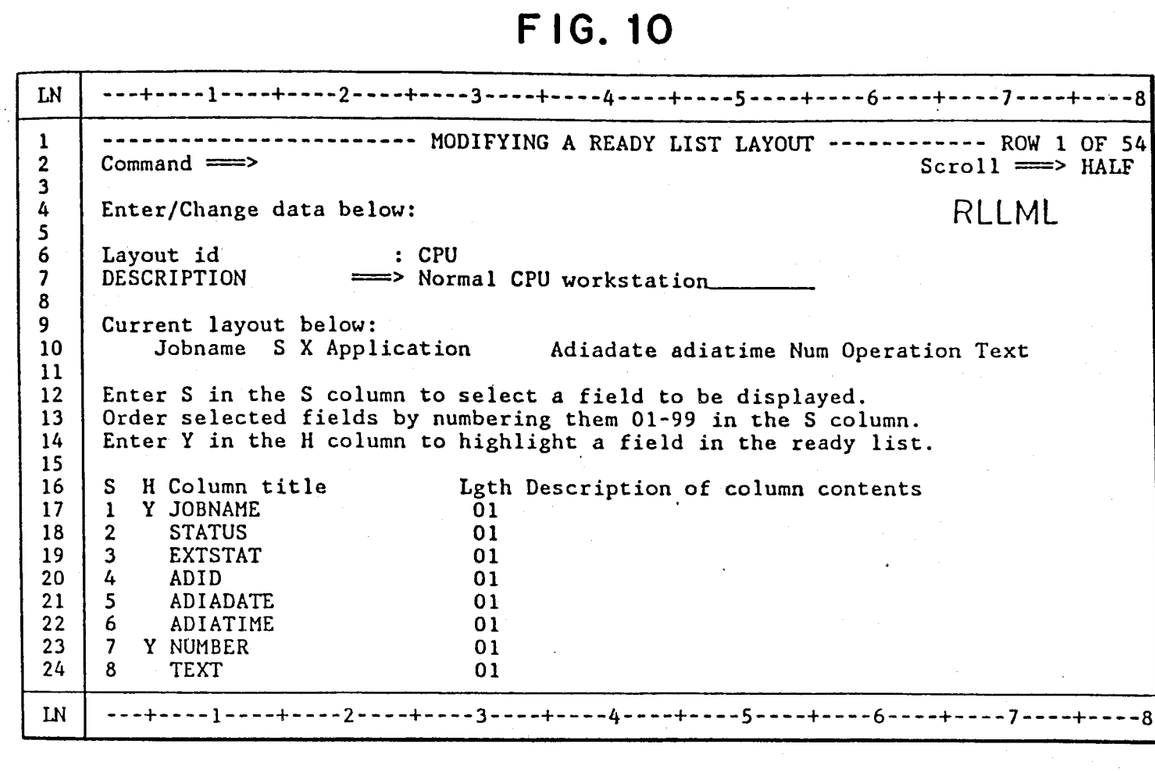

A panel RLLML 55 for modifying a ready list layout will be invoked from the panel RRLLL 49. This panel RLLML for modifying ready list layout is disclosed in more detail in FIG. 10 and the function of this panel is as follows:

Lets the user modify an existing list layout.

The user can change the descriptive text for the layout and change the layout by selecting the fields to be displayed from a list of the fields that exists for the ready list. The user can define which order the fields are to be displayed and if a field is to be highlighted or not. If the number of selected fields exceeds the available size on the screen only the fields that can be displayed fully will be displayed in the layout. The current layout header will be displayed on the screen every time the user presses ENTER. If the user saves the layout it will be kept as a user definition. If an installation definition with the same name exists the user definition will override the installation one until the user definition is deleted. The list of fields can be scrolled via the Scroll command.

Terminates with END, RETURN or CANCEL

| Field | Reply - Action |
|---|---|
| Command | XTBLX Normal commands handled by OPC. |
| | CANCEL rejects modification of the layout. |
| | ISPF Normal ISPF commands. |
| Scroll | ISPF Normal ISPF scrolling values. |
| Ready list type | The name of the new layout. |
| LAYOUT DESCRIPTION | An optional descriptive text for the layout. |
| Layout Header | The current header as it is composed of the currently selected fields. |
| S | Selects a field to be displayed. blank Removes a field from the layout. |
| S | Selects a field to be a part of the layout. The field will be placed at the end of the selected fields. |
| | 1-99 Selects and orders a field in the layout. The fields are ordered in the layout according to the given number. If several fields have been assigned the same ordering number their order is unpredictable. |
| H | Specifies if a field is to be highlighted. A selected field will be displayed as a normal status field. Y The field will be displayed as an important status field. |
| Column title | The title of the field as it will appear in the layout header. |
| Length | The length of the field. The space reserved for the field in the layout is the maximum of this value and the length of the title. |
| Description | A descriptive text of the field. |

In case B (Browse) is selected for the command column for row in the panel RRLLL 49 in FIG. 8, a panel RLLBP 56 for browsing a ready list layout is displayed. According to FIG. 3 the panel 56 will be invoked from the panel 49.

Similarly a panel RSJBL 61 for list of jobs can be selected from the panel RSJBP 43.

Referring further to FIG. 3 a panel ROPIB 65 for browsing operator instructions can be selected from either the panel 52 or the panel 61. Finally the panel RJCLE 63 for setting up work station and job control and a panel RSOSP 64 for setting operator status can be selected from the panel RSRLM 52.

A waiting list panel RSWLL 62 can be selected from the panel 42.

Having thus described my invention, what I claim as new, and desire to secure by Letters Patent is:

1. A method for display panel processing in an interactive terminal-host data processing system, the data processing system having a terminal connected to a host data processor, the host data processor being capable of storing a plurality of display-panel layout specifications, each display-panel layout specification specifying a display panel which the terminal is capable of displaying, the method comprising the steps of:

storing in a host data base in the host data processor data and a display panel library, the display panel library including a plurality of display-panel layout specifications comprising at least one selection-display-panel layout specification specifying a selection-display panel which includes a selection menu from which a user can select a desired processing option and at least one data-entry display-panel layout specification specifying a data-entry display panel for entering data from the terminal into the host data base, displaying at the terminal connected to the host data processor a display-panel list of display-panel layout specifications stored in the library, selecting one display-panel layout specification from the display-panel list and displaying the selected display panel on the terminal, modifying from the terminal the selected display-panel layout specification when the display panel specified by the selected display-panel layout specification is displayed, storing the modified display-panel layout specification in the display-panel library, and using the stored display-panel layout specifications, including the modified display-panel layout specification, in interactive data communication between the terminal and the host data base.

2. A method according to claim 1, wherein said list of display-panel layout specifications comprises a plurality of display-panel layout specifications, each display-panel layout specification being associated with a specific operation in a data processing environment.

3. A method according to claim 2, wherein said specific operation is a work station operation in a data processing installation.

4. A method according to claim 2, wherein said one layout selection is performed by a row command on the row for an item to be selected.

5. A method according to claim 4, wherein said modification of a selected panel layout is performed on a panel for layout modification comprising a list of fields existing in the selected layout.

6. A method according to claim 5, wherein said layout modification is performed by selecting, changing the order and highlighting fields in the list of fields.

7. A method according to claim 4, wherein said layout modification is performed by selecting, changing the order and highlighting fields in the list of fields.

8. A method according to claim 1, wherein said selected one layout is a layout for a specific type of a work station for listing a plurality of jobs to be run on the work station, the jobs being specified by the headlines in the layout.

9. A method according to claim 1, wherein said one layout selection is performed by a row command on the row for an item to be selected.

10. A method according to claim 9, wherein said modification of a selected panel layout is performed on a panel for layout modification comprising a list of fields existing in the selected layout.

11. A method according to claim 10, wherein said layout modification is performed by selecting, changing the order and highlighting fields in the list of fields.

12. A method according to claim 1, wherein said modification of a selected panel layout is performed on a panel for layout modification comprising a list of fields existing in the selected layout.

13. A method according to claim 12, wherein said layout modification is performed by selecting, changing the order and highlighting fields in the list of fields.

* * * * *